(12) United States Patent
Gerster et al.

(10) Patent No.: US 8,153,912 B2
(45) Date of Patent: *Apr. 10, 2012

(54) BABY BALANCE WITH DETACHABLE TRAY HALVES

(75) Inventors: Stephan Gerster, Wachtberg-Pech (DE); Michael Schurr, Murrhardt (DE); Albrecht Stahl, Sulzbach/Murr (DE)

(73) Assignee: Soehnle Professional GmbH & Co. KG, Backang (DE)

( * ) Notice: Subject to any disclaimer, the term of this patent is extended or adjusted under 35 U.S.C. 154(b) by 238 days.

This patent is subject to a terminal disclaimer.

(21) Appl. No.: 12/432,560

(22) Filed: Apr. 29, 2009

(65) Prior Publication Data

US 2009/0294184 A1 Dec. 3, 2009

(30) Foreign Application Priority Data

May 2, 2008 (DE) .......................... 10 2008 021 931

(51) Int. Cl.
G01G 21/22 (2006.01)
G01G 21/28 (2006.01)

(52) U.S. Cl. ................... 177/126; 177/238; 177/262

(58) Field of Classification Search .................. 177/126, 177/127, 238, 262
See application file for complete search history.

(56) References Cited

U.S. PATENT DOCUMENTS

| 1,275,911 | A | 8/1918 | Hansen |
| 2,210,399 | A | 8/1940 | Ericksen |
| 2,931,640 | A | 4/1960 | Riddle, Jr. |
| 274,991 | A | 8/1984 | Wirtz |
| 4,711,313 | A * | 12/1987 | Iida et al. ...................... 177/127 |
| 4,800,973 | A | 1/1989 | Angel |
| 5,414,225 | A * | 5/1995 | Garfinkle ...................... 177/199 |
| 5,499,457 | A | 3/1996 | Weiler et al. |
| 5,637,838 | A | 6/1997 | Arey et al. |
| 6,256,896 | B1 | 7/2001 | Landauer |
| 6,759,605 | B2 * | 7/2004 | Montagnino et al. ......... 177/238 |
| 6,998,543 | B2 | 3/2005 | Sugrue et al. |
| 7,060,914 | B2 * | 6/2006 | Suzuki ........................... 177/238 |
| 7,199,311 | B1 | 4/2007 | Buckner |
| 7,235,746 | B2 | 9/2007 | Williamson |
| 7,397,003 | B2 * | 7/2008 | Cox et al. ...................... 177/238 |
| 7,683,272 | B2 | 11/2008 | Hong |
| 7,893,367 | B2 * | 2/2011 | Gerster ......................... 177/126 |
| 2009/0114455 | A1 | 5/2009 | Mueller et al. |
| 2009/0173550 | A1 | 7/2009 | Gerster |

FOREIGN PATENT DOCUMENTS

| DE | 29611425 U | 11/1997 |
| DE | 29616144 | 1/1998 |
| DE | 102006004961 A1 | 8/2007 |
| DE | 102006004962 A1 | 8/2007 |
| DE | 102006031950 B3 | 11/2007 |
| DE | 102006034871 A1 | 1/2008 |
| FR | 2645956 A1 | 10/1990 |
| FR | 2675255 A1 | 10/1992 |
| FR | 2708343 A1 | 2/1995 |
| WO | 2004038890 A1 | 5/2004 |
| WO | 2007087799 A1 | 8/2007 |

* cited by examiner

*Primary Examiner* — Randy W Gibson

(74) *Attorney, Agent, or Firm* — Leydig, Voit & Mayer, Ltd.

(57) ABSTRACT

A baby scale includes a weighing tray configured to hold a baby and having a first tray half and a second tray half disposable together in a storage position; a measuring device configured to support the weighing tray and configured to determine a weight of the baby, the measuring device including at least one load cell; a display configured to show the weight of the baby; and a connection device configured to establish a mechanical connection and an electrical connection when the first tray half and the second tray half are in a weighing position.

29 Claims, 4 Drawing Sheets

BABY BALANCE WITH DETACHABLE TRAY HALVES

PRIORITY CLAIM

Priority is claimed to DE 10 2008 021 931.2-53, filed May 2, 2008.

FIELD

The present invention relates to baby scales having a weighing tray to hold a baby, having a measuring device that supports the tray and serves to determine the weight of the baby, and having a display to show the determined weight.

BACKGROUND

Baby scales of the above-mentioned type are described in German patent application DE 10 2006 034 871 A1. The prior-art baby scales have a weighing tray to hold a baby, having a measuring device that supports the tray and serves to determine the weight of the baby, and having a display to show the determined weight. The measuring device comprises several load cells so that the weight of the baby can easily be ascertained by placing the baby scales on a substrate. The weighing tray has two tray halves that can be folded together by means of a hinge in order to put the tray into its storage or transport position.

A problematic aspect of prior baby scales is that the hinge mechanism needed for folding the tray is prone to mechanical defects. In order to create a reliable hinge mechanism, it has to be configured so as to be relatively large, which is not attractive in view of the hinge elements that protrude from the tray halves, and which also makes them heavy, an aspect that is not desirable with an eye towards transporting the scales.

Moreover, the protruding hinge elements pose the risk of injury to a baby that is to be weighed. Finally, such a hinge mechanism is also unfavorable in terms of the usual hygiene requirements since dirt particles, residues of baby powder and baby oil or the like can adhere to the hinge mechanism. These residues can be a breeding ground for bacteria, which should be prevented, particularly when it comes to the care of newborns.

SUMMARY

Therefore, an aspect of the present invention is to provide a way that easy and safe handling of the baby scales is achieved with structurally simple means.

In an embodiment, the present invention provides a baby scale including a weighing tray configured to hold a baby and having a first tray half and a second tray half disposable together in a storage position; a measuring device configured to support the weighing tray and configured to determine a weight of the baby, the measuring device including at least one load cell; a display configured to show the weight of the baby; and a connection device configured to establish a mechanical connection and an electrical connection when the first tray half and the second tray half are in a weighing position.

BRIEF DESCRIPTION OF THE DRAWINGS

There are various possibilities for configuring and refining the teaching of the present invention in an advantageous manner. For this purpose, reference is made, on the one hand, to the claims subordinated to claim 1, and on the other hand, to the explanation below of a preferred embodiment of the invention making reference to the drawing. In conjunction with the explanation of the preferred embodiment of the invention making reference to the drawing, generally preferred improvements and refinements of the teaching are explained. The drawing shows the following:

DETAILED DESCRIPTION

Figure 1:
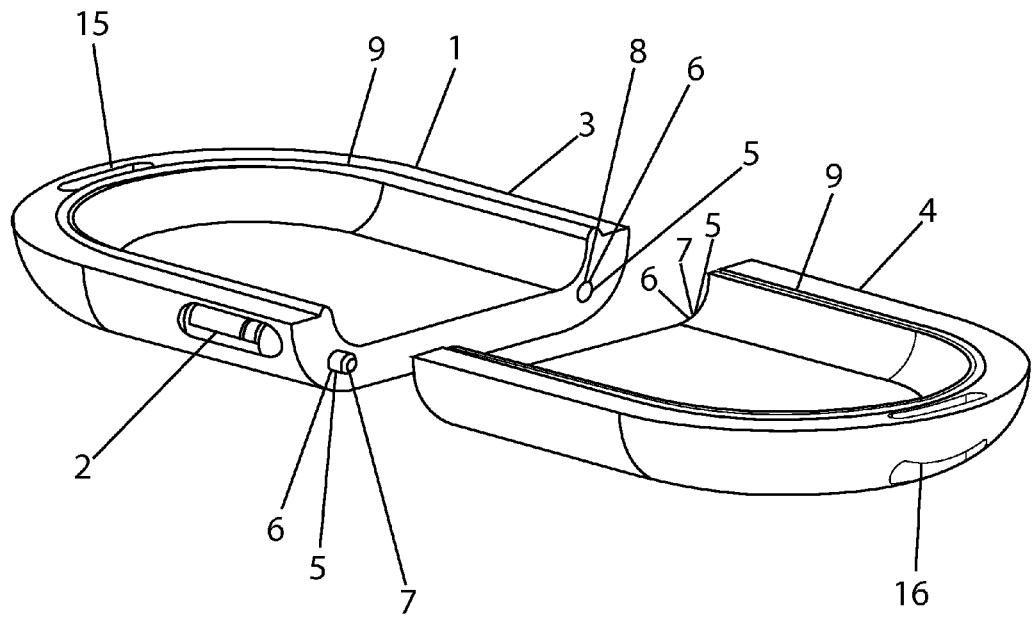
FIG. 1 an embodiment of baby scales according to the invention, in a perspective and schematic depiction, FIG. 2 the embodiment shown in FIG. 1 in the weighing position, in a perspective and schematic depiction, FIG. 3 the embodiment shown in FIG. 1 in the storage position, in a perspective and schematic depiction, FIG. 4 the embodiment shown in FIG. 1 in the storage position with a baseplate, in a perspective and schematic depiction, FIG. 5 the embodiment shown in FIG. 1 in the storage position with an attached baseplate, in a perspective and schematic depiction.

An aspect of the present invention provides baby scales characterized in that the two tray halves have means to establish a mechanical and electrical connection when in the weighing position and they can be laid together in a storage position.

According to the invention, it has been realized that baby scales can be put into a secure storage and transportation position, even without configuring a folding mechanism with hinges for the tray halves. For this purpose, in another inventive manner, the two tray halves have means to mechanically and electrically connect the tray halves in order to attain a secure weighing position. Moreover, the two tray halves can be laid together in a storage position, which translates into a compact and space-saving arrangement of the tray halves. This avoids the drawbacks of the prior-art hinge mechanism.

Consequently, the baby scales according to the invention constitute baby scales with which easy and safe handling of the baby scales is achieved with structurally simple means.

In a structurally simple manner, the means can be in the form of an insertion mechanism having insertion elements. This insertion mechanism allows the tray halves to be easily fit together into the weighing position. Conversely, the insertion mechanism permits the two tray halves to be easily detached so that they can be stacked together. With the insertion mechanism, the baby scales can be handled completely easily and problem-free.

In an advantageous manner, the insertion elements could have a positioning function and/or a latching function. In other words, the insertion elements could provide a secure positioning of the tray halves with respect to each other in order to get the weighing tray ready for use. As an alternative or in addition to this, the insertion elements could have a latching function that prevents the tray halves from being inadvertently separated. Here, the insertion elements can be configured in such a way that they can be clamped together and detached once again manually.

In an embodiment, the insertion elements could be in the form of latching hooks or tongue-and-groove elements.

In a practical manner, the insertion elements can be formed in the faces or contact surfaces of the tray halves. The faces or contact surfaces are the surfaces that are opposite from each other or that are even in contact when the tray halves are in their assembled state. This has the advantage that the insertion elements or the insertion mechanism in the assembled state of the tray halves is practically concealed and invisible, so that there is no risk of injury to the baby that is to be weighed, nor can the insertion mechanism become dirty. Hence, this embodiment with the insertion mechanism formed in the faces or contact surfaces of the tray halves translates into an especially secure configuration of the baby scales.

The measuring device of the baby scales has several load cells that are usually provided under both tray halves. However, it is especially practical to install the power supply and the measuring electronics of the baby scales in one tray half in a compact manner. Consequently, in a advantageous manner, the insertion elements could be configured so as to make the requisite electrical contact with the load cells for purposes of supplying power and/or for purposes of transmitting signals. In this case, the insertion elements ensure that the two tray halves are electrically and mechanically connected. In this context, they establish the electric connection to the load cells in the tray half that does not have a power supply. By the same token, a signal can be transmitted from the load cells of this tray half to the other tray half and thus to the measuring device via the insertion elements. For this purpose, the insertion elements can have suitable electric conductors that are in contact with each other when the tray halves are in their assembled state.

In a structurally especially simple configuration, the insertion elements could have at least one pin or plug installed in one tray half, and at least one matching receptacle for the pin or plug installed in the other tray half. When the tray halves are in the assembled state, the pin or plug is then located in the matching receptacle.

With an eye towards achieving an especially secure connection between the two tray halves, each tray half could have at least one pin or plug as well as at least one receptacle. In order to securely position the tray halves with respect to each other, at least two pins or plugs and at least two matching receptacles should be provided.

In an especially simple manner from the standpoint of production, the tray halves could be made of plastic, preferably rigid plastic. It lends itself to manufacture both tray halves by means of injection molding. By the same token, it is conceivable to extrude the tray halves or to produce them using a deep-drawing method.

With an eye towards making the baby scales comfortable to use, the two tray halves could be cushioned on the inside. The cushioning could be affixed directly onto the surface of the tray halves. By the same token, it is conceivable for the cushioning to be removable, which is especially advantageous for purposes of cleaning. In any case, the cushioning should be moisture-repellant and washable. In this context, it especially lends itself for the cushioning to be made of soft plastic that can be provided there detachably or permanently.

In order to set up the baby scales securely, feet could be provided on the outside of the tray halves so that the weighing tray can be set up. The feet could be advantageously positioned in such a way that they hold the tray halves in the weighing position when the scales are in the set-up state. In order to ensure that the tray halves and thus the baby scales stand especially securely, three feet could be provided for each tray half.

As far as an especially space-saving and elegant configuration is concerned, the feet could contain electronic load cells. In this manner, the load cells can be accommodated securely on the one hand and can be especially well-protected on the other hand.

For purposes of ensuring a highly visible arrangement of the display, the display could be situated in one of the tray halves, preferably on the outside in the edge area. The display could advantageously be configured as an LCD, thus providing a particularly energy-saving display.

In an especially simple manner, the entire electronic system along with the battery or accumulator could be installed in one tray half. This permits a compact arrangement of these components in one tray half.

Fundamentally, it could advantageously be possible to lock and/or latch the position of the two tray halves with respect to each other in the connected weighing position as well as in the laid-together storage position. In order to securely lay the tray halves together, the tray halves could have a tongue-and-groove arrangement along their outer edges. This translates into laying the tray halves together securely and, at the same time, locking them against shifting relative to each other. As an alternative or additionally, the tray halves could be laid together and locked by means of latching hooks. The specific application case should be considered when the appropriate locking elements are to be selected.

In an especially secure manner, the tray halves could be locked and/or latched in the weighing position and/or in the storage position by means of magnets or electric motors installed in the tray halves. For this purpose, electrically driven locking elements and/or latching elements could be provided.

In another manner, the two tray halves, which form the weighing tray when they are attached to each other, create a kind of housing that has a chamber. Within the scope of a preferred embodiment, this housing created by the tray halves is at least partially open in the area of the reciprocal connection of the tray halves. This opening results from the curved shape of the tray halves.

In another embodiment, the opening in the housing could be closed by a baseplate having a closing and locking function. If the opening can be closed, the housing could be used in an especially practical manner to store various accessories for baby treatment and baby care. Since the housing can be closed, the contents of the housing are protected from unintentionally falling out. Moreover, such a baseplate could be configured in such a way that it ultimately ensures that the laid-together tray halves will be held together. For this purpose, said baseplate could extend beyond the outer edges of the tray halves in the positioned state. The baseplate also serves to set up the assembled unit consisting of the tray halves and the baseplate.

In an especially practical manner, the baseplate could have insertion elements for purposes of attaching it to the insertion elements of the tray halves. Here, as a sort of double function, the insertion elements configured for attaching the tray halves could also allow the attachment of the baseplate to the tray halves. Here, however, the insertion elements of the baseplate do not need to have an electrical connection function.

As an alternative or in addition to this, the baseplate could be attached to the tray halves by means of magnets installed in the tray halves and in the baseplate. This, too, ensures a secure attachment between the tray halves and the baseplate.

In another manner, the baseplate could be configured as a slide-in compartment, said baseplate being able to partially extend into the housing.

The slide-in compartment, with a storage space formed by encircling walls, could extend into the housing. This storage space of the slide-in compartment could be used to store accessories for babies.

The baseplate—as mentioned above—serves, among other things, to vertically position the arrangement consisting of the tray halves and the baseplate. In order to securely transport this arrangement, the housing could have an upper carrying handle that, in the laid-together state, is formed by handle parts installed in the two tray halves. In this manner, it is easily possible to grasp the tray halves along with the attached baseplate.

FIG. 1 shows an embodiment of baby scales according to the invention in a perspective and schematic depiction. The baby scales have a weighing tray 1 to hold a baby, having a measuring device that supports the weighing tray 1 and serves to determine the weight of the baby, and having a display 2 to show the determined weight. The measuring device comprises several load cells. The weighing tray 1 has two tray halves 3 and 4 that are separated from each other in FIG. 1. For purposes of problem-free and secure handling of the baby scales, the two tray halves 3 and 4 have means 5 to establish a mechanical and electrical connection when in the weighing position. Moreover, the two tray halves 3 and 4 can be laid together in a storage position.

The means 5 are made up of an insertion mechanism having insertion elements 6. The insertion elements 6 have a positioning function as well as a latching function since, in the inserted state, the tray halves 3 and 4 are positioned in the prescribed manner. Furthermore, the insertion elements 6 are dimensioned in such a way that they can be clamped together and detached once again manually when the tray halves 3 and 4 are in the assembled state The insertion elements 6 create an electric contact between the two tray halves 3 and 4. This electric contact is configured, on the one hand, for purposes of supplying power to the load cells and, on the other hand, for purposes of transmitting signals from the load cells.

The insertion elements 6 have two pins 7 and two receptacles 8 that are alternately installed in the tray halves 3 and 4. In other words, each of the tray halves 3 and 4 has a pin 7 and a receptacle 8 that interact with a matching receptacle 8 and a matching pin 7 of the other tray half 4 and 3.

The display 2 is configured as an LCD and is arranged on the outside in the edge area of the tray half 3. The entire electronic system along with the battery or accumulator is arranged in the tray half 3.

The tray halves 3 and 4 have a tongue-and-groove arrangement that ensues locking in the laid-together state of the tray halves 3 and 4.

Figure 2:
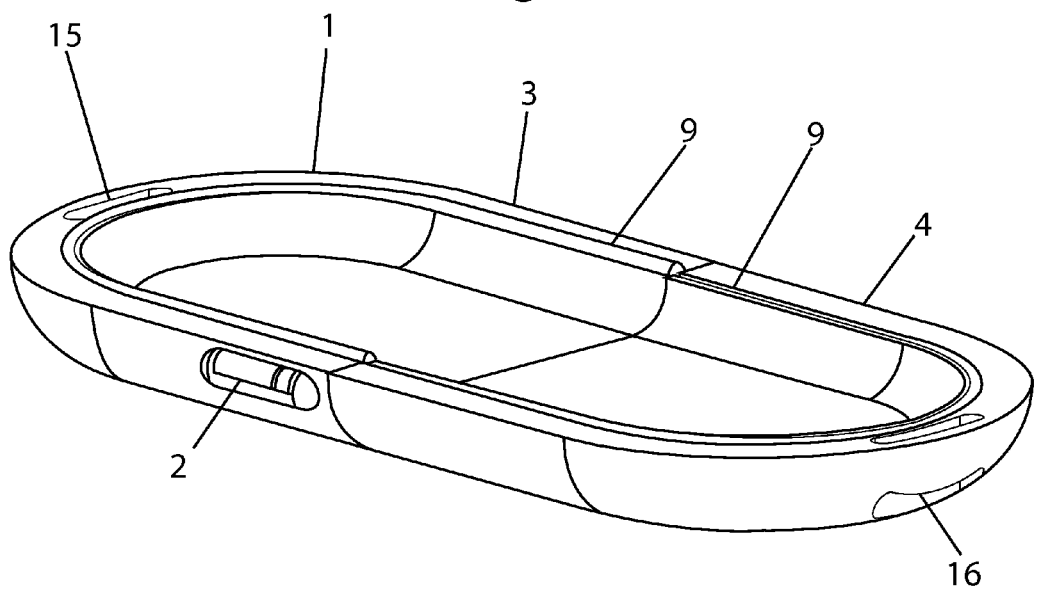
Figure 3:
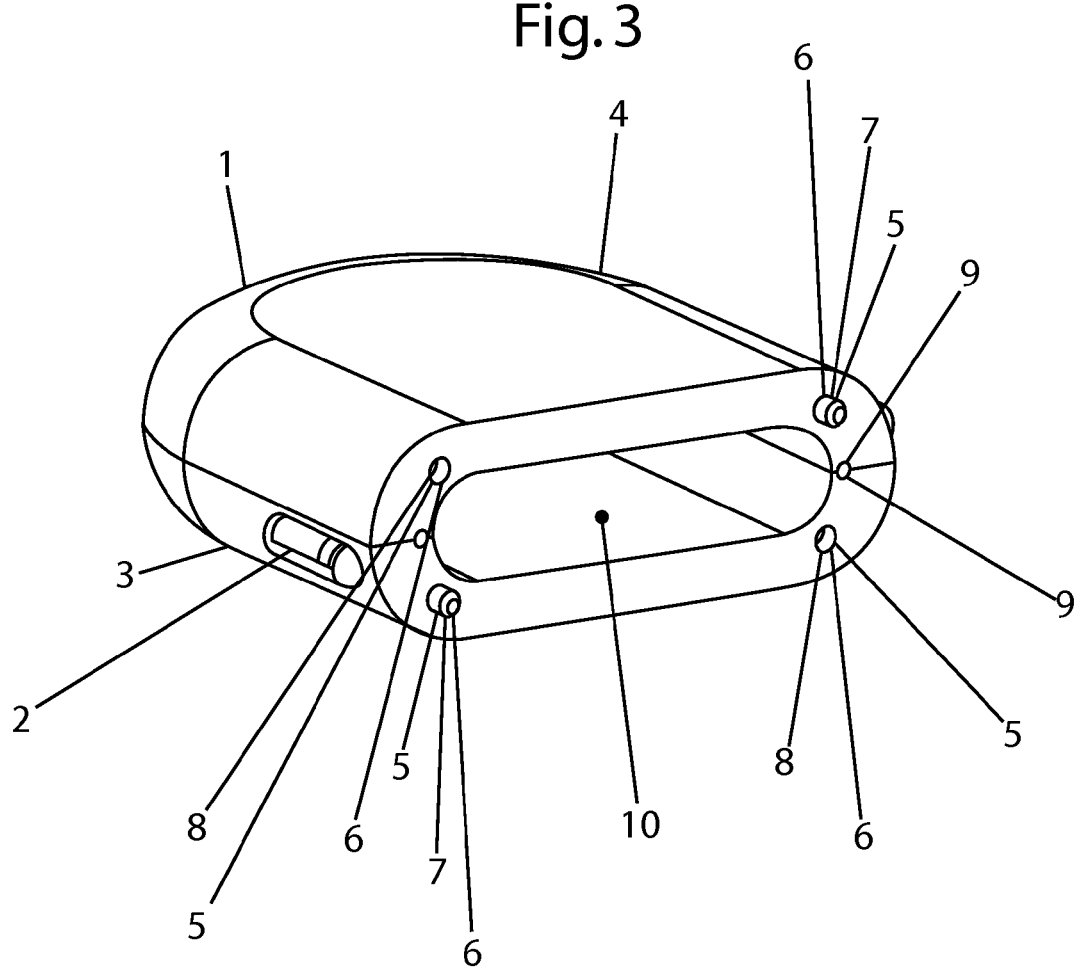

FIGS. 2 and 3 show schematic and perspective views of the embodiment shown in FIG. 1 in the assembled weighing position and in the laid-together storage position. It can be seen in FIG. 3 that, in the laid-together state, the two tray halves 3 and 4 create a housing 10. The housing 10 is configured to be open in the area of the reciprocal connection of the tray halves 3 and 4. The housing 10 can be used to store accessories for babies.

Figure 4:
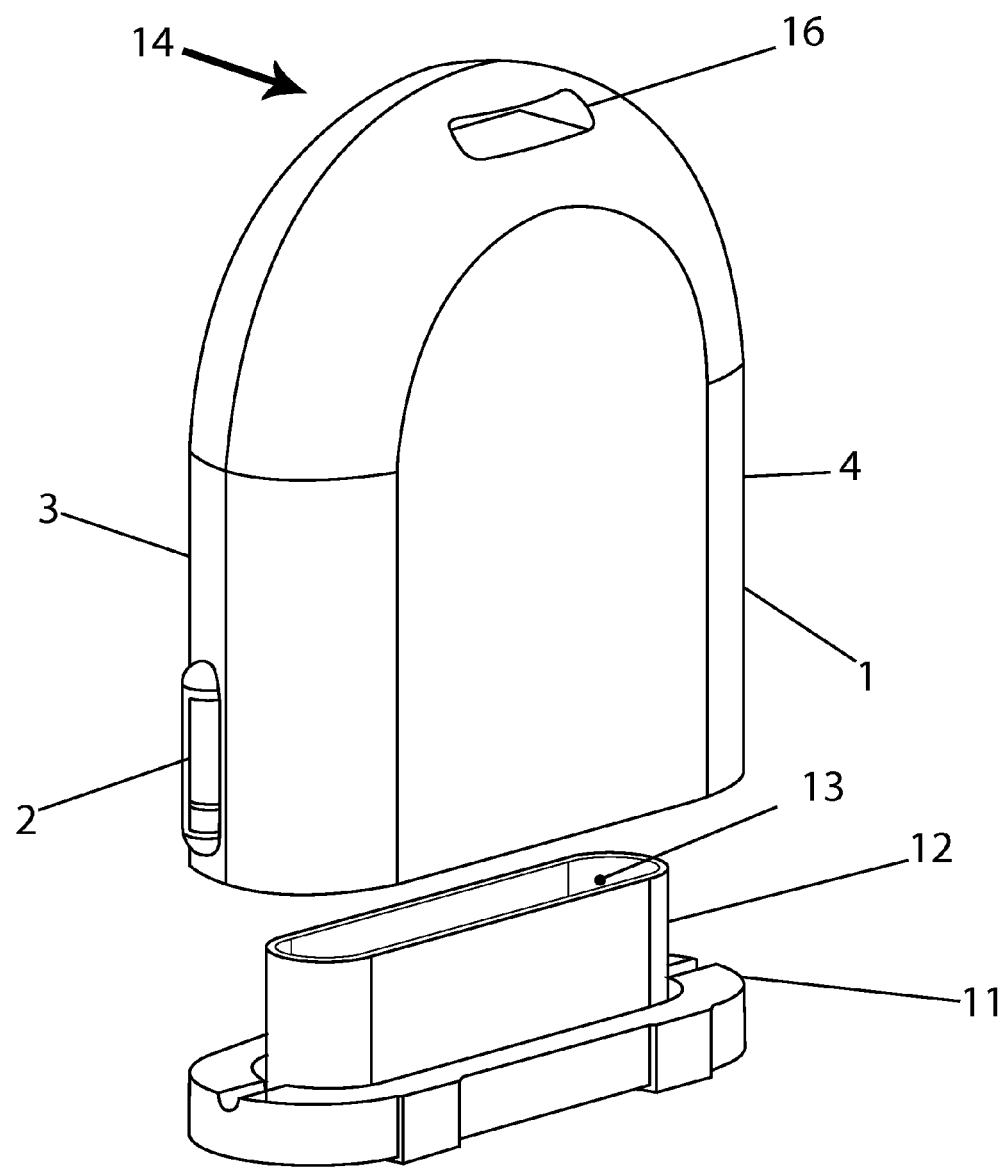
Figure 5:
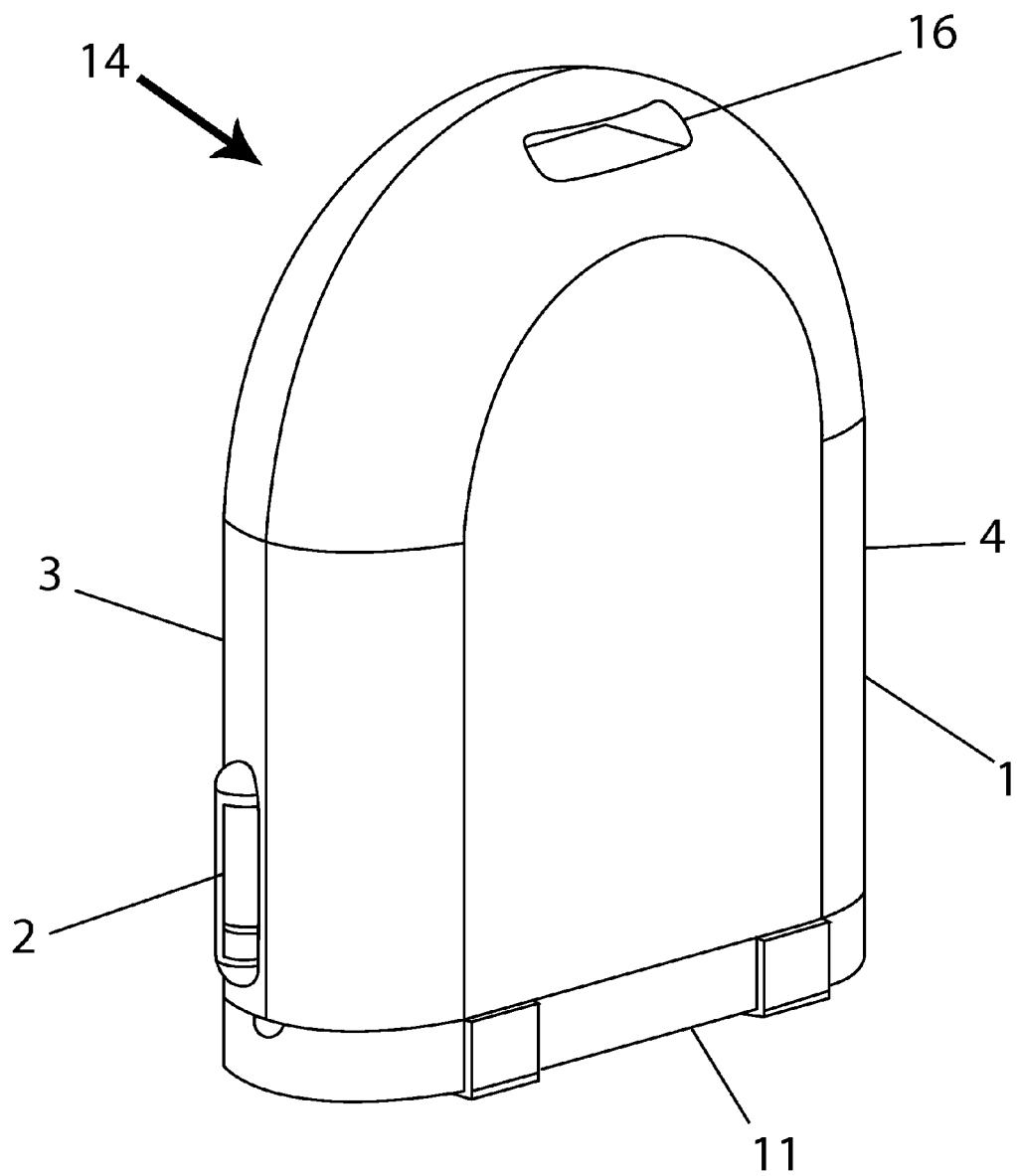

FIGS. 4 and 5 show schematic and perspective views of the tray halves 3 and 4 in the laid-together storage position. A baseplate 11 with a closing and locking function serves to close the housing 10 shown in FIG. 3. In concrete terms, the baseplate 11 has insertion elements (not shown here) for attachment to the insertion elements 6 of the tray halves 3 and 4. As a result, the baseplate 11 ensures a secure storage position of the tray halves 3 and 4.

According to FIG. 4, the baseplate 11 is configured as a slide-in compartment 12 or else the baseplate 11 has a slide-in compartment 12. The slide-in compartment 12, by means of its encircling walls, forms a storage space 13 for accessories for babies.

The housing 10 created by the tray halves 3 and 4 in the laid-together state has an upper carrying handle 14 that is formed by handle parts 15 and 16 installed in the two tray halves 3 and 4.

As far as additional advantageous embodiments of the baby scales according to the invention are concerned, reference is hereby made to the general part of the description as well as to the accompanying claims in order to avoid repetitions.

Finally, it should be explicitly pointed out that the embodiment of the baby scales according to the invention described above serves merely as an explanation of the claimed teaching, but the latter is by no means limited to this embodiment.

The present invention is not limited to the embodiments disclosed herein; reference should be had to the appended claims.

LIST OF REFERENCE NUMERALS 1 scales
2 display
3 tray half
4 tray half
5 means
6 insertion element
7 pin
8 receptacle
9 tongue-and-groove arrangement
10 housing
11 baseplate
12 slide-in compartment
13 storage space
14 carrying handle
15 handle part
16 handle part

The invention claimed is:

1. A baby scale comprising:
a weighing tray configured to hold a baby and having a first tray half and a second tray half detachable from one another so as to be disposable together in a storage position;
a measuring device configured to support the weighing tray and configured to determine a weight of the baby, the measuring device including at least one load cell;
a display configured to show the weight of the baby; and
a connection device configured to establish a mechanical connection and an electrical connection when the first tray half and the second tray half are in a weighing position.

2. The baby scale as recited in claim 1, wherein the connection device includes an insertion mechanism having at least one insertion element.

3. The baby scale as recited in claim 2, wherein the at least one insertion element has at least one of a positioning function and a latching function.

4. The baby scale as recited in claim 2, wherein the at least one insertion element includes a tongue-and-groove element.

5. The baby scale as recited in claim 2, wherein the at least one insertion element is configured to form an electrical contact so as to supply power to the at least one load cell.

6. The baby scale as recited in claim 2, wherein the at least one insertion element is configured to form an electrical contact with the at least one load cell so as to transmit a signal.

7. The baby scale as recited in claim 2, wherein the at least one insertion element includes at least one of a pin and a plug disposed in the first tray half and at least one matching receptacle configured to receive at least one of a pin and a plug disposed in the second tray half.

8. The baby scale as recited in claim 7, wherein the at least One insertion element includes at least one of a second pin and a second plug disposed in the second tray half and at least one second matching receptacle configured to receive at least one of a second pin and a second plug disposed in the first tray half.

9. The baby scale as recited in claim 1, wherein the first tray half and the second tray half include plastic.

10. The baby scale as recited in claim 1, wherein the first tray half and the second tray half include a cushioning on an inside surface thereof.

11. The baby scale as recited in claim 10, wherein the cushioning includes a soft plastic.

12. The baby scale as recited in claim 1, further comprising at least one foot disposed on an outside surface of the first tray half and the second tray half.

13. The baby scale as recited in claim 12, wherein the at least one foot is disposed so as to hold the first tray half and the second tray half when the baby scale is in the weighing position.

14. The baby scale as recited in claim 12, wherein the at least one foot includes three feet disposed on the first tray half and three feet disposed on the second tray half.

15. The baby scale as recited in claim 12, wherein the at least one load cell is disposed in the least one foot.

16. The baby scale as recited in claim 1, wherein the display is disposed in one of the first tray half and the second tray half and includes an LCD.

17. The baby scale as recited in claim 1, further comprising an electronic system disposed in one of the first tray half and the second tray half and including at least one of a battery and an accumulator.

18. The baby scale as recited in claim 1, wherein the first tray half and the second tray hall are at least one of lockable and latchable with respect to each other in the weighing position and in the storage position.

19. The baby scale as recited in claim 1, wherein the first tray half and the second tray half include a tongue-and-groove arrangement so as to lock the first tray half and the second tray half together in the storage position.

20. The baby scale as recited in claim 1, wherein a latching hook device locks the first tray half and the second tray half together in the storage position.

21. The baby scale as recited in claim 1, wherein the first tray half and the second tray half form a housing in the storage position.

22. The baby scale as recited in claim 21, wherein the housing includes an opening in an area of the connection device.

23. The baby scale as recited in claim 22, further comprising a baseplate configured to close the opening and having a closing and a locking function.

24. The baby scale as recited in claim 23, wherein the connection device includes an insertion mechanism having at least one insertion element and wherein the baseplate includes at least one second insertion element configured to attach the baseplate to the at least one insertion element of the connection device.

25. The baby scale as recited in claim 23, further comprising a respective magnet disposed on each of the first tray half and the second tray half and the baseplate and configured to attach the baseplate to the first tray half and the second tray half.

26. The baby scale as recited in claim 23, wherein the baseplate includes a slide-in compartment.

27. The baby scale as recited in claim 26, wherein the slide-in compartment includes a storage space formed by encircling walls and extends into the housing.

28. The baby scale as recited in claim 27, wherein the slide-in compartment is configured to store accessories for babies.

29. The baby scale as recited in claim 21, wherein the housing includes an upper carrying handle formed by a first handle part disposed on the first tray half and a second handle part disposed on the second tray half in the storage position of the first tray half and the second tray half.

* * * * *